(12) United States Patent
Segovia De La Torre et al.

(10) Patent No.: US 11,647,307 B2
(45) Date of Patent: May 9, 2023

(54) CMOS OPTICAL SENSOR WITH A SCALABLE REPAIRING SCHEME FOR REPAIR DEFECTIVE READOUT CHANNELS PROVIDING A FURTHER FUNCTION OF ROW NOISE SUPPRESSION AND CORRESPONDING ROW NOISE SUPPRESSION METHOD

(71) Applicant: TELEDYNE INNOVACIONES MICROELECTRONICAS SLU, Seville (ES)

(72) Inventors: Jose Angel Segovia De La Torre, Seville (ES); Rafael Dominguez Castro, Seville (ES); Ana Gonzalez Marquez, Seville (ES); Rafael Romay, Seville (ES)

(73) Assignee: TELEDYNE INNOVACIONES MICROELECTRONICAS SLU, Seville (ES)

( * ) Notice: Subject to any disclaimer, the term of this patent is extended or adjusted under 35 U.S.C. 154(b) by 0 days.

(21) Appl. No.: 17/595,099

(22) PCT Filed: May 15, 2020

(86) PCT No.: PCT/EP2020/063587
§ 371 (c)(1),
(2) Date: Nov. 9, 2021

(87) PCT Pub. No.: WO2020/234143
PCT Pub. Date: Nov. 26, 2020

(65) Prior Publication Data
US 2022/0217292 A1 Jul. 7, 2022

(30) Foreign Application Priority Data
May 17, 2019 (EP) .................................... 19382392

(51) Int. Cl.
*H04N 5/367* (2011.01)
*H04N 5/365* (2011.01)
(Continued)

(52) U.S. Cl.
CPC ........... *H04N 5/367* (2013.01); *H04N 5/3651* (2013.01); *H04N 5/378* (2013.01); *H04N 5/3745* (2013.01)

(58) Field of Classification Search
CPC .... H04N 5/367; H04N 5/3651; H04N 5/3745; H04N 5/378; H04N 5/361; H04N 5/3655; H04N 5/3658
See application file for complete search history.

(56) References Cited

U.S. PATENT DOCUMENTS

2006/0125940 A1* 6/2006 Tinkler ................. H04N 5/367
348/E5.081
2006/0261255 A1* 11/2006 Raynor ............. H01L 27/14609
250/214 R
(Continued)

FOREIGN PATENT DOCUMENTS

WO 2008150283 A1 12/2008

OTHER PUBLICATIONS

International Search Report and Written Opinion of the International Searching Authority for PCT/EP2020/063587 dated Jul. 27, 2020, 9 pages.

Primary Examiner — Nhan T Tran
(74) Attorney, Agent, or Firm — K&L Gates LLP

(57) ABSTRACT

A CMOS optical sensor comprises spare readout channels to replace readout channels found defective at the end of the manufacturing process. These spare readout channels are dispatched over the width of the optical sensor (corresponding to the row direction) in the form of spare groups $G_{m1}$, $G_{m2}$, $Gm_3$ of m spare readout channels each, m integer at (Continued)

least equal to 1. Each spare group is inserted between two successive default groups $Gn_1$ and $Gn_2$ of n default readout channels each and coupling means SW1 are configured to replace a defective default readout channel in a default group as well as any default readout channels of the group between the defective one and the spare group next to the default group of concern. Advantageously, for a row $Row_i$ being currently selected for CDS reading each pixel in the row, a row noise level $V_{RN_i}$ is obtained from the A spare readout channels that are not used in the implemented repairing scheme, by sampling an analogic DC reference signal by each of the A spare readout channels and averaging the A values $Sp_k$ obtained. The row reference value $V_{RN_i}$ is then subtracted from each of the pixel digital signal $S_{i,j}$ outputs for the current selected row, to finally obtain a signal value $d_{i,j}$ with row noise suppression.

20 Claims, 7 Drawing Sheets

(51) Int. Cl.
*H04N 5/3745* (2011.01)
*H04N 5/378* (2011.01)

(56) References Cited

U.S. PATENT DOCUMENTS

| | | | |
|---|---|---|---|
| 2009/0108177 A1* | 4/2009 | Chou | H04N 5/3658 |
| | | | 438/4 |
| 2015/0237277 A1* | 8/2015 | Honda | H04N 5/378 |
| | | | 348/302 |

* cited by examiner

CMOS OPTICAL SENSOR WITH A SCALABLE REPAIRING SCHEME FOR REPAIR DEFECTIVE READOUT CHANNELS PROVIDING A FURTHER FUNCTION OF ROW NOISE SUPPRESSION AND CORRESPONDING ROW NOISE SUPPRESSION METHOD

The present application is a national stage application filed under 35 U.S.C. § 371 claiming benefit of and priority to International Application No. PCT/EP2020/063587 entitled CMOS OPTICAL SENSOR WITH A SCALABLE REPAIRING SCHEME FOR REPAIR DEFECTIVE READOUT CHANNELS PROVIDING A FURTHER FUNCTION OF ROW NOISE SUPPRESSION AND CORRESPONDING ROW NOISE SUPPRESSION METHOD, filed May 15, 2020, which further claims benefit of and priority to European patent application No. 19382392.9, filed May 17, 2019, both of which applications are incorporated herein by reference in their entireties and for all purposes.

TECHNICAL DOMAIN

The present invention relates to an optical sensor and more particularly a CMOS optical sensor, having internal means to repair defective readout channels.

BACKGROUND

As well known in the art, an optical sensor comprises an array of pixels, with pixels arranged in lines and columns, and every pixel in a column is coupled to a respective column conductor through a selection transistor, to allow its reading through a respective readout channel of a readout circuitry. The readout circuitry comprises as many readout channels as columns of pixels in the array and is basically configured to enable the reading of the pixels of one selected row at a time. In practice, each readout channel is directly coupled at its input to a respective column conductor of the pixel array (generally on foot of the column) and provides at its output an image information representing the amount of light received by a selected pixel in the column. The term "readout channel" is a generic term to designate the circuitry by which a pixel in a column of the array is read, which comprises at least a pre-amplifier (charge or voltage amplifier), an input of which is connected to the respective column conductor, and an output of which is applied to a sample and hold circuit which provides analogic samples for conversion to an analog to digital converter (ADC). The ADC can be part of the readout channel and then the output of the readout channel is a digital value; or else, the ADC is shared by at least a group of column conductors and then the output of the readout channel is an analog signal which is applied to the ADC according to a column decoding sequence. This is well known art.

Optical sensors are increasingly used, and CMOS sensors especially, because of their low manufacturing costs, high electronic integration capabilities (semiconductor technology), low operating voltages, low power consumption, high speed processing capabilities to mention just a few.

Many applications of CMOS optical sensors require large pixel arrays to satisfy the increasing demand for large field of view and/or high resolution, which has led to miniaturization, with a decrease of the pixel pitch, based on finer geometry semiconductor technologies. As a consequence, the risk of manufacturing defects has increased which is a manufacturing cost issue and/or an image quality issue.

Manufacturing defects may be caused in particular by dust particles during the photolithographic steps and may cause different parts or elements of the optical sensor to be found defective. In practice the defects are detected and localized through optical inspection and/or electric and operational tests at the end of the manufacturing process, and may consist for instance (which means not limited to) of: short circuit, open circuit, impedance mismatch, etc.

According to which element is defective, the consequence on the operation of the optical sensor may be very different. For instance, when the defective element is inside a pixel, which means an element of the pixel structure, the defect can be either ignored or corrected by post-processing steps based on interpolation based on neighborhood pixels when digitally processing the captured image. But when the defect occurs on a functional element such which is shared by a large set of pixels, like a readout channel associated with a column of pixels of the array, then the defect is much more noticeable in the captured image and it degrades the image quality; also, post-processing correction becomes more difficult and less efficient while costly in time, resources and power consumption.

For these reasons, it is known art to provide the optical sensor with integrated repairing means coupled between the column conductors (array of pixels) and the readout channels (readout circuitry) which enable to operatively couple a column conductor to either the default readout channel or a redundant one. Basically, at least a redundant readout channel is provided in the sensor circuit which comes in addition to the default readout channels and switching means are associated with each column conductor of the array, to operatively connect each column conductor either to its default readout channel or to the redundant readout channel. Such a repairing scheme is described in US2006/00261255 for instance. However, speaking of large arrays, the repairing circuit should enable to repair all and any defective readout channel, at any position, without overly complicating the column decoding scheme nor increasing the surface area too much.

US2009/0108177 proposes a repairing circuitry based on replacing readout channels on a group basis. Specifically, a group of default readout channels can be replaced by the neighboring group and this group replacement process propagates from one group to another in a row direction until the last group of default readout channels in the readout circuitry, which is replaced with a spare group located next to it. By providing a spare group on each side of the assembly formed by all the default readout channels, the proposed repairing circuitry enables to isolated and replace two default readout channels groups each found to comprise at least one defective channel, one through a shifting of groups in the left direction, another through a shifting of groups in the right direction. This solution however needs a selection circuitry which is dependent on the number of columns per group to shift, and is based on having the defective channels located within the width of one group or two groups. There is a need for a more flexible solution to easily adapt to large arrays of different sizes. Also, the proposed solution should advantageously be suited to stitching technologies which are used in advanced IC manufacturing.

There is also a noise concern with CMOS optical sensor. The level of the noise determines the lowest illumination level that can fairly be detected by the sensor. In various filed of application of the optical sensors, the capture conditions of may vary a lot, moving from a bright environment to a dark one, with objects in the field of you close or far, etc. It is a recurrent demand of the market to propose optical sensors having a wide dynamic range and able to detecting weak signals. The level of the noise determines the lowest illumination level that can fairly be detected by the sensor The electronics elements of the pixel structure (photodiodes or photogates, and transistors), and the readout circuitry (transistors, logic gates, amplifiers) together with the row selection sequence for capturing (scanning) an image are all noise sources, which generate fixed pattern noise (FPN) and temporal, low frequency, noise which limit the signal-to-noise ratio and the dynamic range of the sensor, and hence the quality of the captured image. Fixed spatial noise is in account of the technological dispersion of the characteristics of the electronic elements (photodiodes, transistors, amplifiers) which depends of the technology and manufacturing process. It can be defined as the difference between the signals from two pixels having received the same amount of light. Temporal noise is a random, low frequency noise originating from different sources. Temporal noise comprises in particular thermal noise, shot noise and flicker noise (1/f noise) originating from the pixels; but also row noise which originates from the readout circuitry and conversion sequence, on a row by row basis. Further large arrays are generally obtained through small geometries technologies. However, it is generally known that low frequency noise generated by MOS transistors is more important when the length of their channel decreases.

Several methods to reduce the noise level are known that are implemented at the level of the readout circuitry. Among these methods, the widely applied correlated double sampling, known under its acronym "CDS", enables to remove thermal noise (KT/C) through sensing twice the pixel to subtract a reset level of the pixel from a signal level (analog or digital subtraction) of the pixel to generate a pixel value. CDS reduces at the same time FPN and 1/f noise and the better noise reduction result is achieved through true CDS which is obtained when the reset level is sensed first, which is not always possible, depending on the pixel structure and driving method (rolling or global shutter mode, in particular). False CDS is when the signal level is sampled before the reset level. However CDS does not treat row noise generated by the readout sequencing process. Another known noise reduction method (which can combine with CDS either true or false CDS) consists in subtracting an offset signal (analog) or an offset value (digital) which offset signal or value represents dark current generated in the pixels. Dark current is generated by electric charges accumulated in the photosensitive element of the pixel (photodiode or photogate) in absence of incident light and it varies from one pixel to another (due to technological dispersions of the characteristics of the electronics on the array). Dark current comes in addition to the current generated in response to the light incident to the pixel, which is the one to be measured precisely, especially for weak signals (low incident light). Dark current reduction technics are generally based on supplemental black pixels (masked from light) provided on at least one side of the pixels array, and used to provide an offset value (average) which is subtracted from each pixel value, either in analog or in digital. Note that if the subtraction is done in digital, which means readout conversion of the black pixel value(s), then the method may contribute in reducing row noise. However, because the black pixels are on a side of the array of pixels, in addition to being area consuming, it is not fully representative of the dispersion of the characteristics of the pixels in the array, especially when applied to large pixels arrays. Preparing an average value as an offset value from several or all black pixels does not fully compensate for this side effect. Further, if the offset value is subtracted in analog, row noise due to the readout conversion is not handled.

SUMMARY OF THE INVENTION

One aspect of the present invention is about repairing of readout channels through a scalable scheme, which adapts easily to any size of pixel arrays, and easy to configure or program in each sensor device, after the localization of the defects.

Another aspect of the present invention is about reducing temporal row noise due to the readout circuitry, for still reducing visible pattern noise in large array's optic sensors. More specifically, the invention seeks at proposing a new temporal row noise reduction method which takes into account the row wise noise variation, along the width of the readout row which the applicant has found to be a non-negligible variation specifically in a large array optic sensor.

A further aspect of the invention is about a same circuitry consuming negligible extra area for achieving both above repairing and row noise reduction aspects.

Then the invention relates to a CMOS optical sensor comprising a pixel array comprising P rows and N columns of pixels, P and N integers, wherein the pixels belonging to a same column are connected to a respective column conductor and a readout circuitry coupled to the N column conductors of the pixel array to output a digital pixel value for each pixel in a selected row.

According to the invention, the readout circuitry comprises:
  a. N default readout channels, one per respective column conductor of the pixel array and M spare readout channels, with M<N,
  b. the N+M readout channels are arranged by groups in a repetitive pattern sequence in a row direction of one default group of n successive default readout channels then one spare group of m successive spare readout channels, n and m, integers, N/n integer greater than 1; and M/m integer greater than 1; and
  c. N switching circuits, one per column conductor of the pixel array, each switching circuit configured to electrically connect a respective one of the N column conductors to one readout channel of the readout circuitry selected among: a default channel for said column conductor, a first replacement readout channel on a left side of said default readout conductor, a second replacement readout channel on a right side of said default readout conductor, wherein said readout circuitry is configured to set the first switch circuits such that, when in a default group comprises a defective readout channel, one of a left shift coupling pattern or a right shift coupling pattern applies, wherein the left shift coupling pattern selects said first, left, replacement readout channel as a replacement to each of the readout channels of said default group starting from the defective readout channel down to the first readout channel of said default group, wherein the right shift coupling pattern selects said second, right, replacement readout channel as a replacement to each of the readout channels in said default group starting from the defective readout channel up to the nth readout channel in said default group.

When m=1, the first, left, replacement readout channel in each first switching circuit is the readout channel next on the left side to the default readout channel, and the second, right, replacement readout channel is the readout channel next on the right side to the default readout channel.

When m>1, a replacement pattern is on a m group basis and the first, left, replacement readout channel in each first switching circuit is a readout channel at m ranks further on the left side to the default readout channel, and the second, right, replacement readout channel is the readout channel at m ranks further on the right side to the default readout channel.

Advantageously, the optical sensor further comprises:
an analog DC voltage reference bus which extends in the row direction over the width of the readout circuitry and
second switching circuits, one per spare readout channel, each of said second switching circuit to selectively connect the respective spare readout channel when unselected by any first switching circuit, to said reference bus, wherein the N and M readout channels all implement a correlated double sampling, and the readout circuitry further implements a digital row noise suppression function configured for calculating an average row noise value from digital signals obtained from the spare readout channel(s) operatively coupled to the DC reference bus through the second switch circuits and not selected through any of the first switch and for subtracting said average row noise value from each of the pixel values for the current selected row provided by the readout channels operatively coupled to respective column conductors of the array through the first switch circuits.

Preferably, the analog DC reference voltage is set to a mid-range value of an analog to digital conversion range, and is advantageously provided by a programmable DAC converter provided in the optical sensor.

The invention concerns also a low noise read method in such an optical sensor.

Other characteristics and advantages of the invention will now be described, by way of non-limiting examples and embodiments, with reference to the accompanying drawings, in which.

Figure 2:
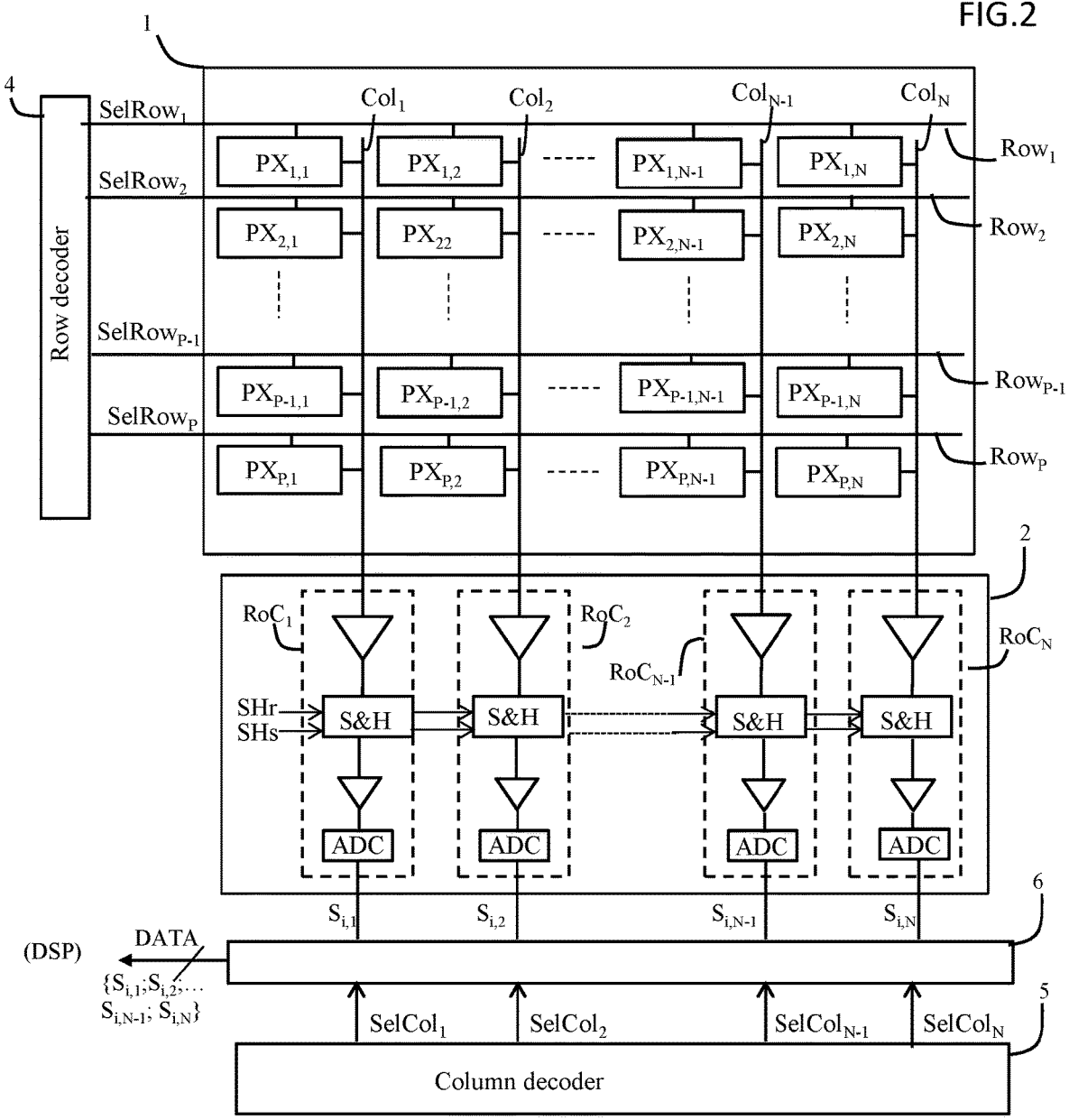
FIG. 2 is a variant of FIG. 1 when each readout channel comprises its own analog to digital converter.
Figure 3:
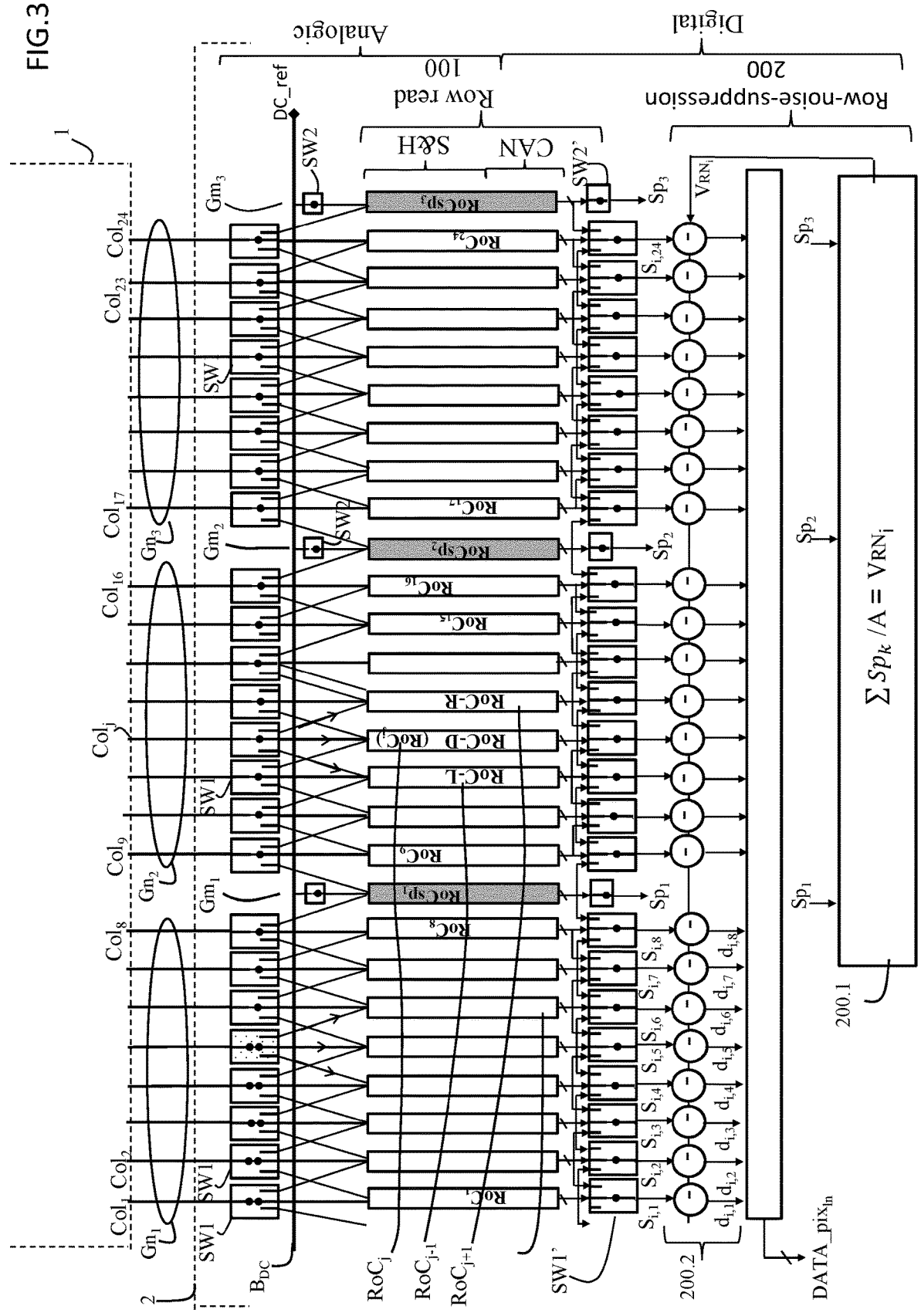
Figure 4:
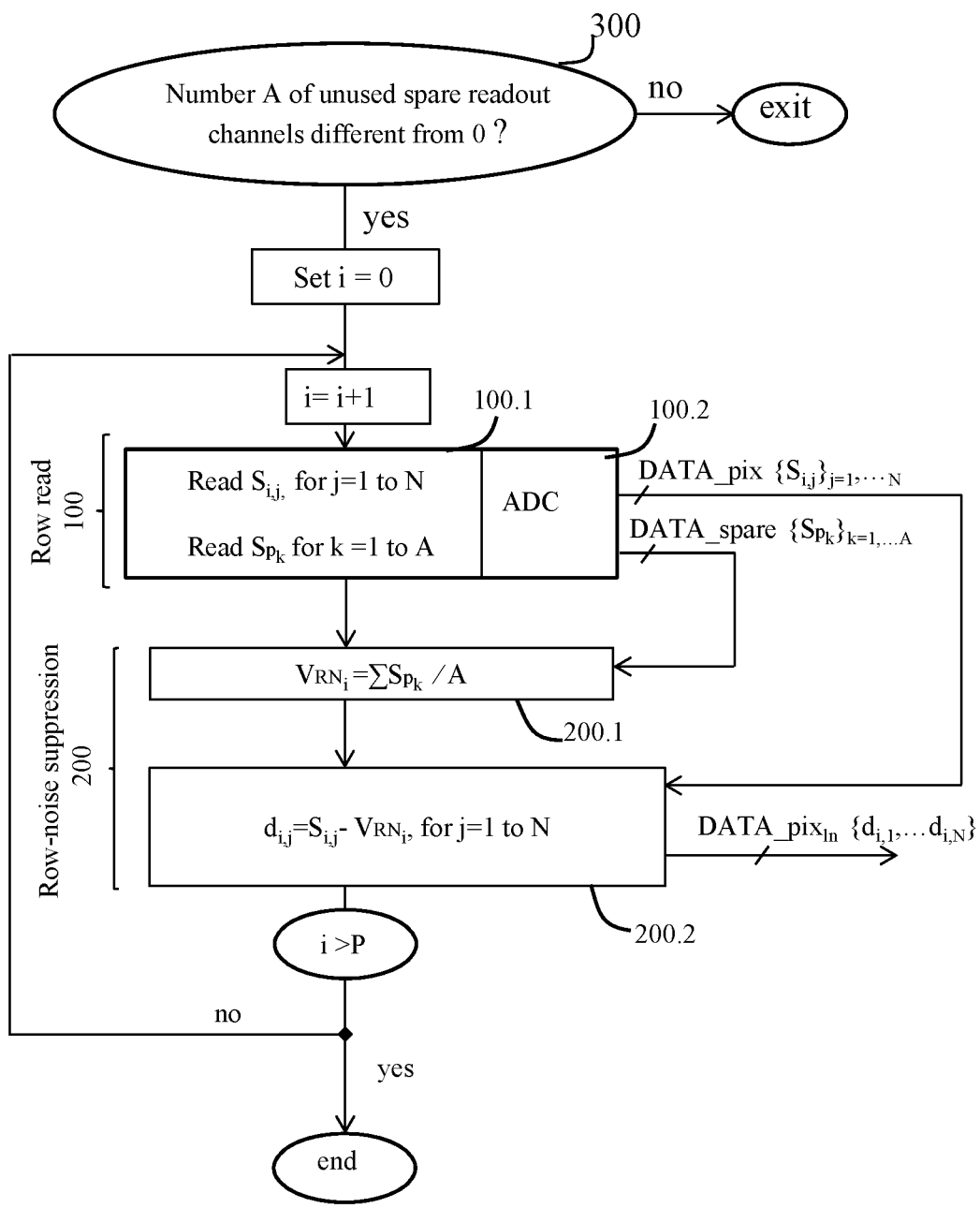
Figure 5:
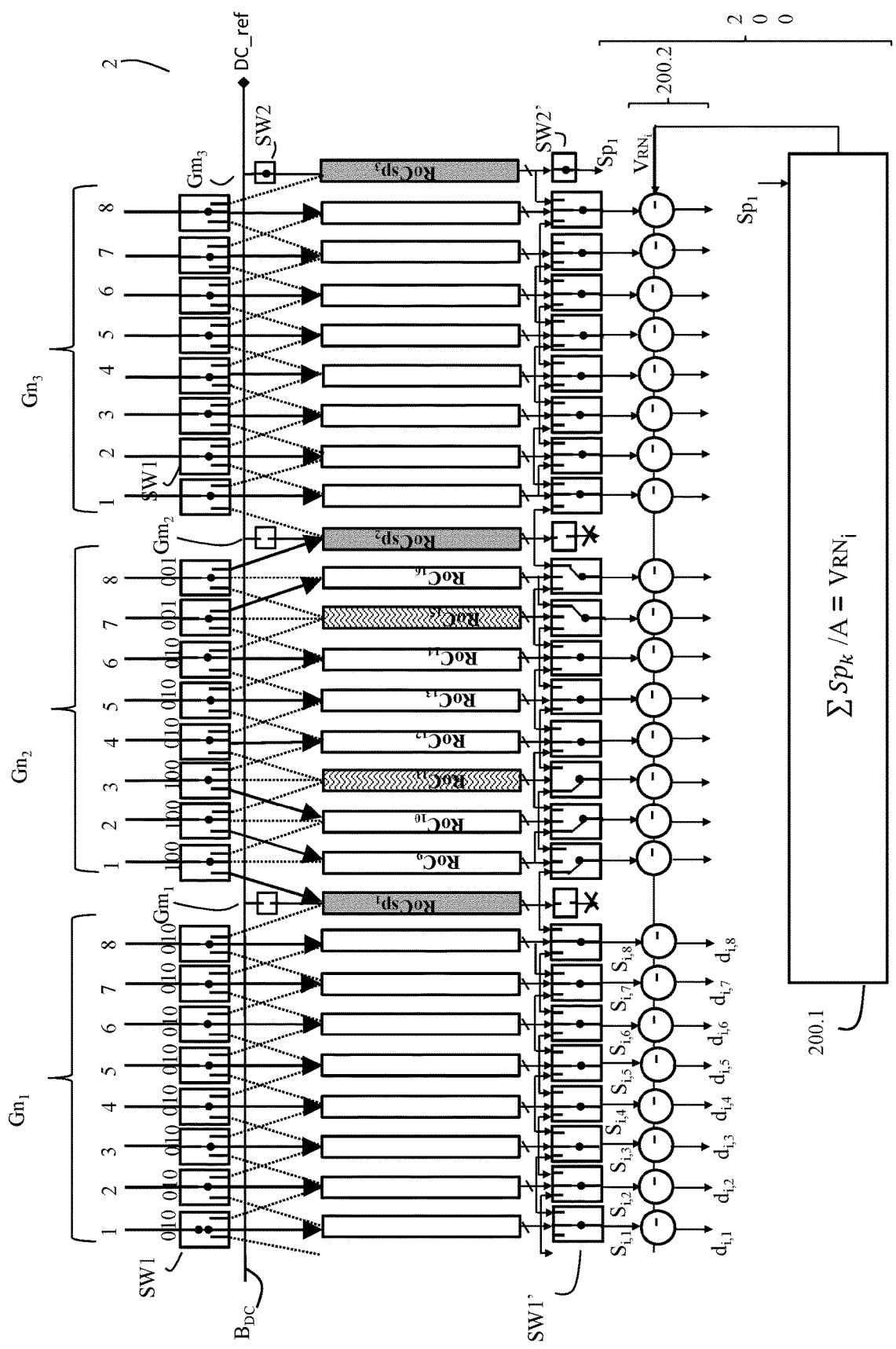
Figure 6:
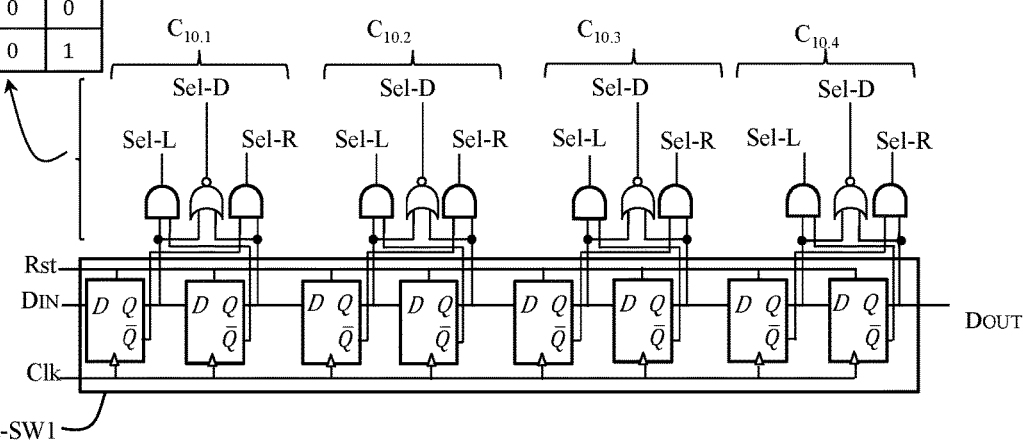
Figure 7:
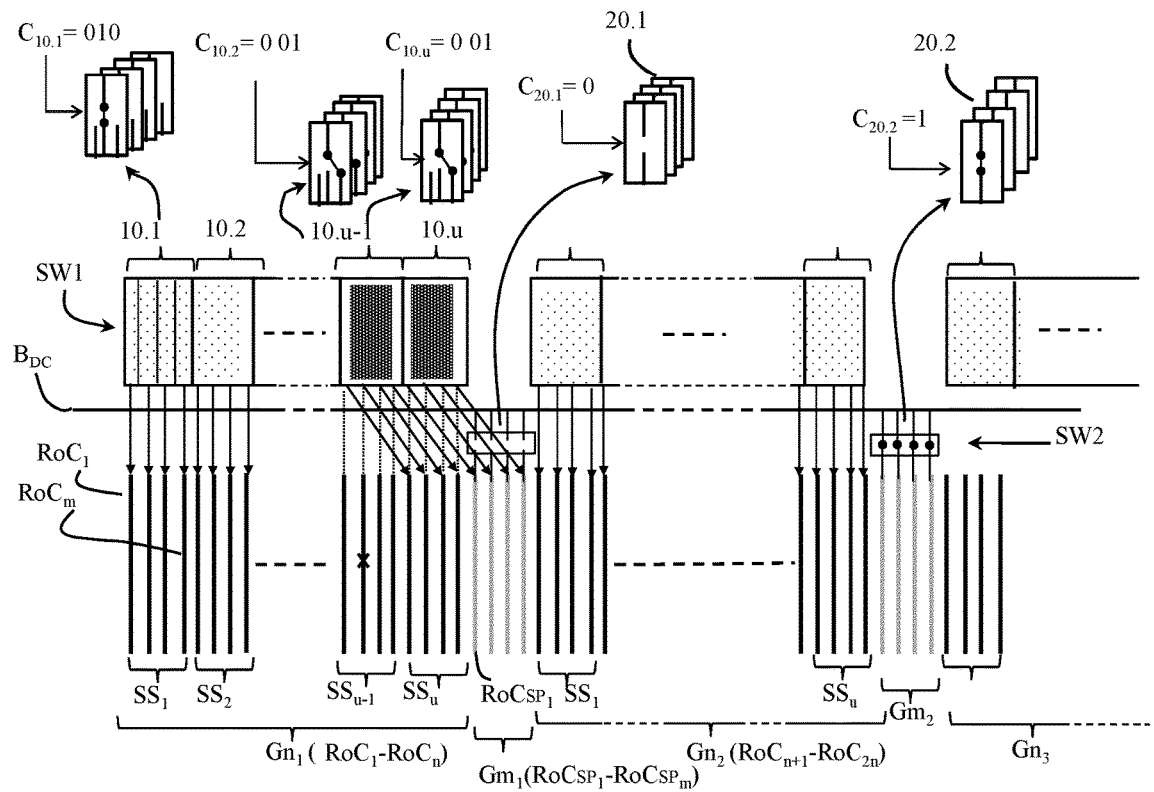
Figure 8:
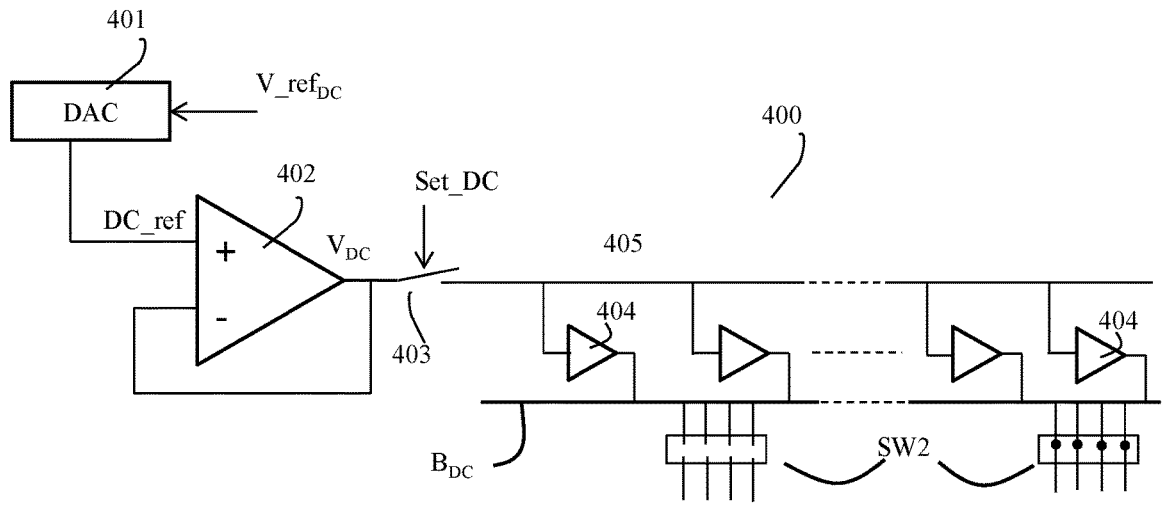
Figure 9:
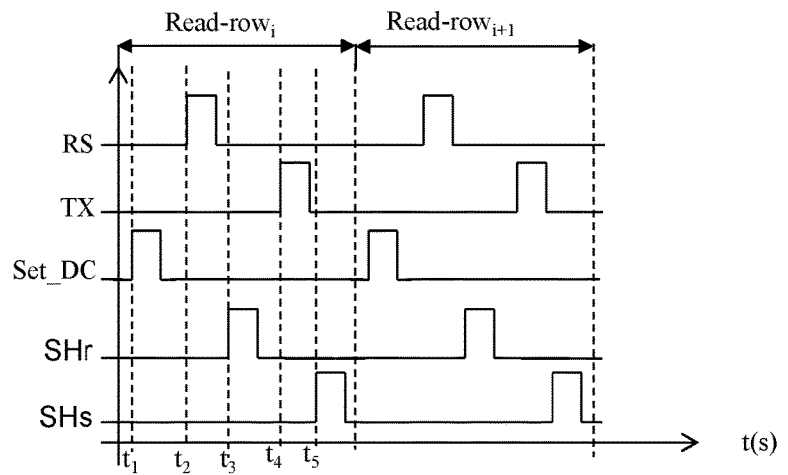

FIG. 3 illustrates a schematic diagram of a readout circuitry including a repairing circuitry with spare readout channels dispersed among the default readout channels on the basis of one spare readout channel every n default readout channel according to a first example embodiment of the invention, for an optical sensor with analog to digital conversion means included in each readout channel as illustrated in FIG. 2, and a row noise reduction stage based on unused spare readout channels;

FIG. 4 is a schematic diagram of a row noise reduction process according to the invention;

FIG. 5 shows in the schematic diagram of FIG. 3, the related couplings and row noise reduction operation in case of two defective default readout channels being replaced according to the principles of the invention;

FIG. 6 illustrates an example of a readout channel selection circuit and programming tools adapted to a repairing circuitry according to the first embodiment of the invention;

FIG. 7 illustrates a schematic diagram of a repairing circuitry and row noise reduction stage according to a second example embodiment of the invention providing m>1 spare readout channels every n default readout channels;

FIG. 8 illustrates an example implementation of a analog DC reference generation and distribution over a reference bus through distributed buffers in a row direction and an associated selection circuit to couple the reference bus only with unused spare readout channels according to the row noise reduction aspect of the invention;

FIG. 9 illustrates a simplified chronogram of a CDS readout sequence in an optical sensor comprising spare readout channels and selection circuits to implement both a repairing function and a row noise reduction function according to the invention.

DETAILED DESCRIPTION OF EMBODIMENTS

Figure 1:
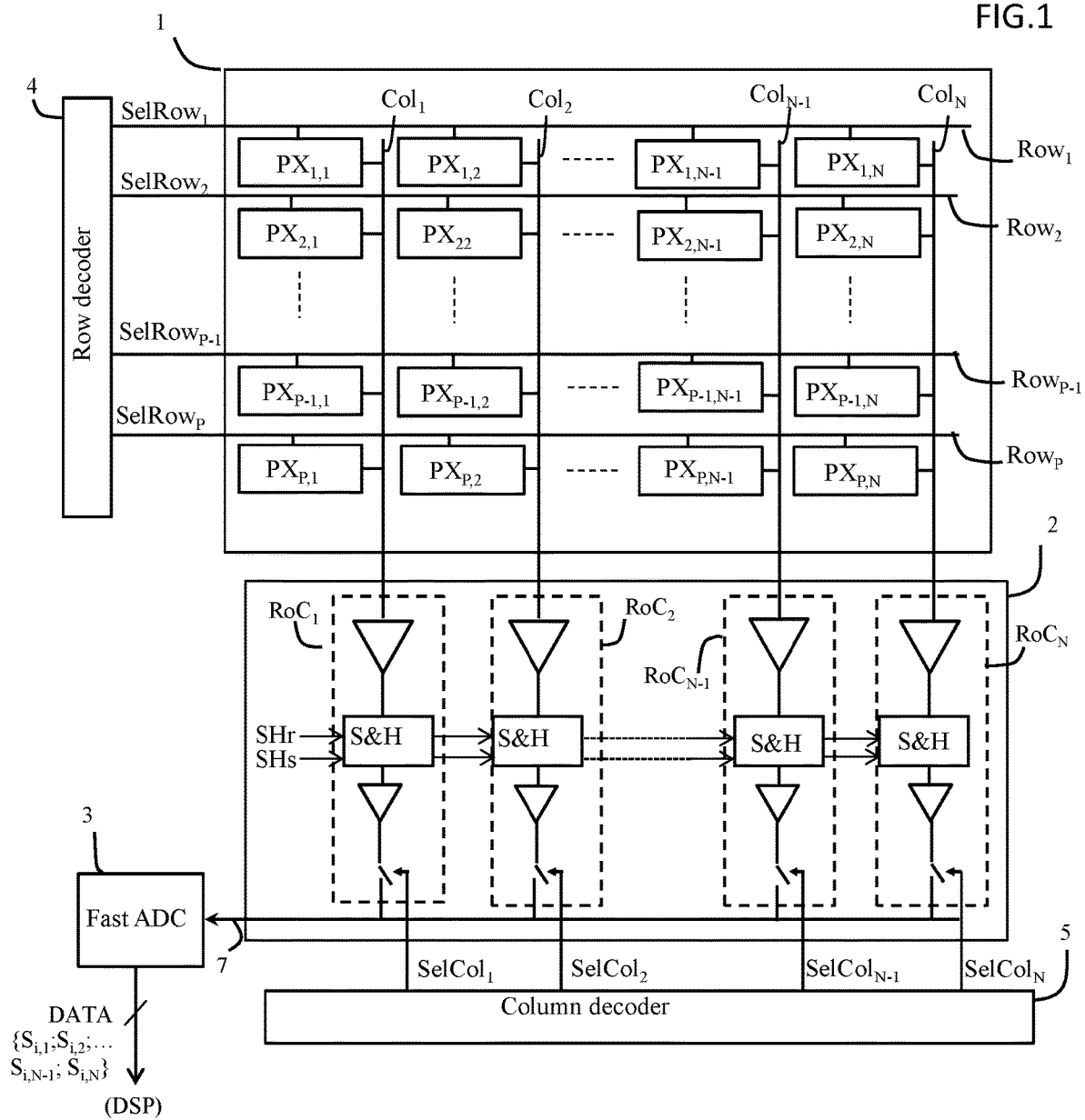
FIG. 1 illustrates a general block diagram of an optical sensor in an example embodiment comprising one analog to digital converter shared by the readout channels of the readout circuitry.

FIGS. 1 and 2 both illustrate the main circuit elements of a CMOS optical sensor. The difference between the two figures stands only in the analog to digital conversion circuit being either shared by all the pixels (FIG. 1) or common to only the pixels in a same column (FIG. 2). Note that other configurations may exist, and for instance, a same ADC could be shared by pixels of a subset of columns. Also, especially when the optical sensor has a large array, which means thousands of rows and columns, it is common art to provide for two readout circuitries, one on foot of the columns and the other on top of the columns, to achieve speediness. Everything that is going to be said in relation with the invention applies to any of these different configurations, and in particular to that of FIG. 1 and FIG. 2 as well.

A basic CMOS optical sensor is illustrated in FIGS. 1 and 2. Note that the term CMOS applies in fact to the electronic circuits around the pixel array, in particular the readout circuitry and the decoders. The pixels uses MOS elements, including photodiodes or photogates as photosensitive elements, and MOS transistors to assume at least a function of selection of the pixel in the array, to read it, and then we speak of passive pixels. But the pixels are preferably active pixels, and we speaks generally then of APS pixels and APS sensor. This means that the pixel structure includes more than one transistor, specifically X transistors where X is equal to or higher than 3. The structure is then 3T, 4T, 5T, or more. These XT structures enable to control different mode of operation of the pixels, in particular: the integration (linear, logarithmic) by the pixels can be in rolling or global shutter mode, with electron multiplying effect . . . etc; and the reading mode: CDS, binning, etc. The X transistors of a XT pixel structure can be all proper to the pixel or some can be shared with other pixels.

The sensor comprises then pixels organized in an array 1, and which have a pixel structure comprised basically of a photosensitive element (photodiode, photogate) and transistors (MOS). The array 1 comprises P rows ($Row_1$ to $Row_P$) and N columns ($Col_1$ to $Col_N$) of pixels (P, N integers greater than 1). The pixels are noted $PX_{i,j}$ where i, an integer equal to 1 to P represents the rank of the row in a column direction; and j, an integer equal to 1 to N represents the rank of the column in a row direction. The pixels arranged in one and the same column are coupled to a respective column conductor among the N of the array. The pixels arranged in one and the same row are controlled by a respective row selection line among the P row selection lines of the array. Speaking of large arrays, N and P may equate several thousands, around 8000 for example.

A readout circuitry 2 to read the pixels of the array comprises N readout channels $RoC_1$ to $RoC_N$, each readout channel RoC$_1$ (j integer equal to 1 to N) coupled with the column conductor (Col) of same rank j in the array 1, to enable the production at the output of the readout channel of a signal representative of an illumination level received by a selected pixel in the corresponding column. The term "coupled" means connected, directly or through any coupling element.

In FIG. 1, the output of the readout channels is an analogic signal: each output is sequentially sent for digital conversion to a fast ADC (analog to digital converter) 3, under control of a column decoder 5. In FIG. 2, the output of the readout channels is a digital signal, each readout channel comprising its own ADC.

A readout channel classically comprises a sample and hold circuit, to obtain an analog sampled signal representative of an illumination level of a selected pixel, which is then digitized. Amplifiers are generally provided before the sample and hold circuit, for loading purpose, in view of the high capacitance of either the column conductors upstream. In case of an ADC shared by multiple readout channels (FIG. 1), output amplifiers may also be provided to load the output line conductor 7 between the readout channels and the ADC.

The sequencing of the pixels and the readout circuitry is made through an addressing circuit comprising a row decoder 4, to sequentially select one row at a time, in the readout sequence of the array, and the column decoder 5, to sequentially forward the signal delivered by each readout channel, towards the ADC converter 3 (FIG. 1) or a data shift register 6 (FIG. 2). In final, digital data information DATA of the captured image are sent to a digital processor DSP for further processing including post processing for enhancing the image quality and processing(s) specific to the application. The DSP may be integrated in all or in part in the optical sensor integrated circuit. This means that some post processing operations may be done inside the optical sensor, which comprise for instance statistical computation on the data flow such as histograms, and others applicative operations are done in an applicative DSP outside the optical sensor.

The decoding circuits 4 and 5 operate under proper clock signals generated by a sequencing circuit (not illustrated) which generates all the signals needed to control the integration sequence by the pixels and the reading sequence of the pixels for each capture frame, and in particular controls the row and column decoders. This is all well-known art.

In practice, the readout channels generally implement CDS, which means that two samples are obtained from each pixel. The CDS subtraction between a reset signal and an information signal is obtained before (in analogic) or in the course of the analog to digital conversion. For instance, with an ADC based on a linear ramp, a counter is used which is configured in up-counting mode for one sample and in down-counting mode for the other sample. The resulting signal is in particular free of fixed pattern noise and kTC noise generated at the pixel.

The invention will be now explained in details in the following description, with reference to FIGS. 3 to 9. It can be implemented in any CMOS optical sensor, having the general characteristics explained above in relation with FIGS. 1 and 2. Note that the invention is not limited to a particular ADC converter type but applies generally to any type of ADC (ramp with single or dual slope, SAR, sigma delta, etc.); and is not limited to the configurations illustrated on FIGS. 1 and 2, with one ADC shared by the N readout channels (FIG. 1), or one ADC per channel (FIG. 2).

According to the invention, the CMOS optical sensor comprises spare readout channels like RoCsp$_1$ in FIG. 3, to replace readout channels found defective at the end of the manufacturing process. These spare readout channels are dispatched over the width of the optical sensor (corresponding to the row direction) in the form of spare groups G$_{m1}$, G$_{m2}$, Gm$_3$ of m spare readout channels each, m integer at least equal to 1, each spare group being inserted between two successive default groups of n default readout channels each. For instance in FIG. 3, the spare group Gm$_1$ is inserted between the two default groups Gn$_1$ and Gn$_2$. On a practical level, this insertion of spare channels among default readout channels is possible because the width of a readout channel is less than the pixel pitch of the array, and the total number of spare readout channels is only a fraction of the total number of default readout channels. For instance: if we add 1 spare readout channel every 32, the readout channel pitch needs to be reduced by 3%. In a 8K pixel array, 8192 columns, it would mean we have 256 spare readout channels.

At the end of the manufacturing process, if any default readout channel is found defective in a default group, coupling means are configured to replace the defective default readout channel as well as any default readout channels between the defective one and the spare group next to the default group of concern, preferably the nearest spare group with respect to the position or rank (in the default group) of the defective readout channel. To be complete, this supposes that the defective spare readout channel is not itself defective, but in practice, the probability in a large array that a spare readout channel is defective is very low (there are far less spare readout channels than defaults ones). Also, there is still the possibility then to use the next spare group, as will become apparent from the description below.

According to whether the spare groups comprises just one spare readout channel or more than one readout channel, the replacement scheme is built on a one to one basis (first embodiment) or per groups of m default readout channels (second embodiment). This is to be explained in details below.

According to another aspect of the invention, the spare readout channels that remain unused (after the repairing step of the defective readout channels), are used to sample an analogic DC reference signal from a reference bus and convert it in digital, at the same time that the pixels in a current selected row of the array are read. This makes it possible to obtain from each spare readout channel, a DC ref value (digital) from a respective readout channel and ADC exactly through the same readout electronic and driving mechanism as the one for any data signal S$_{i,j}$ from the pixels in the selected row Row$_i$. In particular the CDS reading applies the same way, which enables in fact to obtain a value that represents a row noise level for the current selected row. We call this value a row reference value V$_{RN_i}$, which is an average of the DC Ref values obtained from each of the unused spare readout channels, which is expressed as follows: V$_{RN_i}$=$\Sigma$Sp$_k$/A, where A is the number of unused spare channels and k, an integer, equal to 1 to A, corresponding to a rank of the A unused spare channels with reference to a row direction, from instance from the left to the right in the plane of the drawing sheet of FIG. 3.

This row reference value V$_{RN_i}$ is then subtracted from each of the pixel digital signal S$_{i,j}$ outputs for the current selected row, Row$_i$, to finally obtain a low-noise signal value d$_{i,j}$, in which the row noise is suppressed or at last reduced.

This row noise suppression process is summarized in the diagram of FIG. 4. It requires than at least one spare readout channel is unused, but this is what happens in practice. Then at each new selected row, a new DC reference is obtained which is subtracted from each pixel signal $S_{i,j}$, to deliver a low noise signal $d_{i,j}$. This row noise suppression process is performing because, in addition to taking into account the vertical variation of the row noise, by computing a new reference value at each new selected row, it takes in account the row noise variation over the length of the row (horizontal variation), which has been found to be not negligible in practice. The latter is thanks to the dispersion over the length of the row of the spare readout channels (or spare groups). Finally, as well known, the row noise in the pixel signals is reduced by the factor square root of A, where A is the number of spare readout channels used to generate the reference value.

Note that the DC reference signal used for this row noise suppression is in practice a DC analogic voltage, which level is determined with respect to the ADC range, to be in the range of conversion of the ADC, preferably in the middle range, so that the row noise evaluation is coherent with the ADC converting range.

This can be adapted easily in any sensor for any application through providing a programmable register associated with a DAC preferably inside the sensor itself, to generate a specified analogic voltage. This and other further details on how the DC reference signal is generated will be detailed later in the description.

But before, the repairing process is now described in details, with reference to different embodiments of the invention.

First Embodiment

A first embodiment of the present invention is illustrated on FIG. 3. Note that to improve the readability of the figure, the pixel array 1 is not represented in details, except the extremity of the columns conductors $Col_1$ to $Col_N$, which are each to be operatively coupled to a respective readout channel of the readout circuitry 2.

We will first describe the repairing means, and then the row-noise-suppression means.

Repairing Means

According to a first embodiment of the invention, the readout circuitry 2 comprises spare readout channel and configurable coupling means to achieve the coupling of a column conductor with its default readout channel or with a different readout channel according to a repairing pattern defined according to the number and position of the defective channels found.

Spare readout channels are inserted among the default readout channels, on the basis of one spare readout channel every n default readout channels. In other words, each spare group is composed of a single spare readout channel and the default readout channels are grouped by sequence of n successive readout channels, which gives the groups $Gn_1$, $Gn_2$ and $Gn_3$ on FIG. 3, with n=8. Note that n=8 is only for the purpose of the illustration in the reduce space of a drawing sheet. In fact n will generally be greater, for instance equal to 32. This is to compare with the statistics on the number of defective readout channels for a given technology. The ratio of 1/128 is realistic for nowadays large array CMOS sensors.

In the example, with a convention of a column rank increasing in a row direction from the left to the right as illustrated in the figures, the first default group $Gn_1$ is the one for the n first column conductors $Col_1$ to $Col_8$; the second one $Gn_2$, is for the n successive column conductors $Col_9$ to $Col_{16}$ . . . etc. A first spare group $Gm_1$ comprising one spare readout channel $RoCsp_1$ is then provided between $Gn_1$ and $Gn_2$; another spare group $Gm_2$ comprising one spare readout channel $RoCsp_2$ is provided between $Gn_2$ and $Gn_3$, and so on. Note that it is not necessary in practice to provide for a spare group on the left side of the first default readout column $RoC_1$ of the first default group $Gn_1$, and neither on the right side of the last default readout column $RoC_N$ (belonging to the last default group $Gn_{N/n}$).

N Switching circuits SW1 as multiplexing elements to couple each of the N column conductors of the array 1 to one readout channel selected among three readout channels of the readout circuitry 2, that are, for a given column conductor:

a. a default readout channel RoC-D, which is that normally coupled with the given column conductor;
 b. a first replacement readout channel RoC-L next to the default readout channel on the left side (in the row direction) and this first replacement readout channel can be a "default" or a "spare" type readout channel, according to the rank of the default readout channel in its default group,
 c. a second replacement readout channel RoC-R next to the default readout channel on the right side (in the row direction) and this second replacement readout channel can be a "default" or a "spare" type readout channel, according to the rank of the default readout channel in its default group.

Note that readout channel "next to" on the right side (or the left side) means the one immediately successive in the right row direction (or the left row direction).

Let us take the column conductor $Col_j$ in the default group $Gn_2$ as shown in FIG. 3.

Its default readout channel RoC-D is $RoC_j$.

Its first replacement readout channel RoC-L is a "default" type one, $RoC_{j-1}$, because $RoC_j$ in FIG. 3 is not the first channel (at the first rank in the left row direction) in the default group $Gn_2$. The first rank channel of $Gn_2$ is RoC9 and, the "left" readout channel RoC-L for $RoC_9$ is the spare readout channel, $RoCsp_1$ between $Gn_1$ and $Gn_2$.

Similarly, its second replacement readout channel RoC-R is a "default" type one, $RoC_{j+1}$, because $RoC_1$ is not the last channel in $Gn_2$ (at the n rank in the right row direction). The last rank channel of $Gn_2$ is $RoC_{16}$, and the "right" readout channel RoC-R for $RoC_{16}$ is the spare readout channel $RoCsp_2$ between $Gn_2$ and $Gn_3$.

FIG. 5 illustrates a repairing pattern combining both channel shifting to the right and to the left inside a default group Gn2, then using the two spare readout channels framing $Gn_2$ on its left and right case. In the example, two default readout channels $RoC_{11}$ and $RoC_{15}$ have been found defective in $Gn_2$, which are the readout channels respectively at rank 3 and 7 in $Gn_2$. These defective channels are represented with a wave pattern in the figure.

Then the repairing schema in $Gn_2$ according to the above principle applies as follows:

$RoC_{15}$ up to $RoC_{16}$ are each replaced with their second replacement readout channel RoC-R, which are respectively $RoC_{16}$ for $RoC_{15}$, and $RoCsp_2$ for $RoC_{16}$; this corresponds to a right shift coupling pattern.
 $RoC_{11}$ down to $RoC_9$ are each replaced with their "left" readout channel RoC-L, which are respectively $RoC_{10}$ for $RoC_{11}$, $RoC_9$ for $RoC_{11}$ and $RoCsp_1$ for $RoC_9$; this corresponds to a left shift coupling pattern.

RoC$_{12}$ up RoC$_{14}$ are not replaced, and are the operational readout channels for their respective column conductors. This corresponds to the default coupling pattern.

In practice, the coupling of each column conductor to a respective readout channel among the three possibilities is implemented through configuration of the switch circuits SW1 (analog multiplexer): the input of each first switch SW1 is connected to an extremity of a respective column conductor, and the switch is configured to route the input to a single one of three outputs RoC-L, RoC-D and RoC-R. This means that the logic command on the three "elementary" switches in each switch SW1 can take only 3 combinations: "010", which corresponds to the default output, RoC-D (see switches associated with RoC$_4$ and RoC$_5$ in Gn$_2$); "100", which corresponds to a left shift coupling pattern, enabling the RoC-L output (see switches associated with RoC$_9$ to RoC$_{11}$ in Gn$_2$); or "001", which corresponds to a right shift coupling pattern, enabling the RoC-R output (see switches associated with RoC$_{15}$ and RoC$_{16}$ in Gn$_2$). Then a two bit logic signal is enough to program/configure one over the three combinations in each switching circuit SW1, as illustrated by the decoding table TAB1 in FIG. 6. In the example a shift register Set-SW1 is associated to a number of logical circuits each producing the set of switch signals to control one switch circuit SW1. 2 bits of the shift register generates one command set [Sel-L, Sel-R and Sel-R] applicable to a respective switch circuit SW1, for example that associated with RoC$_1$. In practice, the shift register is a set of elementary shift registers in series to generate the N command sets [Sel-L, Sel-R and Sel-R] for the N switching circuits SW1.

These first switches SW1 are on the input side of the readout circuitry 2. At the output side, the column decoder is able to implement a decoder process that takes in account the coupling pattern implemented by the switch circuits SW1. This means that the column decoder will successively select N readout channels per image frame, that are the N channels operatively used for reading the N pixels in each row. Or else, that the column decoder will sequentially select each of the readout channels implemented in the circuitry 2, either default and spare ones, and the correct data will be sorted out by the DSP according to the implemented coupling pattern.

Although FIGS. 3 and 5 show a readout circuitry in which each readout channel has its own ADC, such that the outputs are digital outputs to be transmitted in series sequentially through a data shift register 6 towards a DSP (FIG. 2), the same would apply in case of analogic outputs to be sequentially applied for conversion to a fast ADC (FIG. 1).

But, as illustrated in FIGS. 3 and 5, switch circuits SW1' realizing the inverse routing function of input first switches SW1 may be implemented in real (instead of by software as proposed in the preceding paragraph), each to route the output delivered by a RoC-L or RoC-R replacement channel back to the corresponding default output signal line. The input command for the corresponding circuits SW1 and SW1' is exactly the same, which limits the need in configurable/programmable means to configure the switching circuits. For instance, where the left output (RoC-L) was selected at the input by one SW1 circuit, the left input (Roc-L) is selected by the corresponding one SW1' circuit at the output. This representation in hardware is convenient to make clear the whole repairing scheme. But it is also convenient for purpose of the description to yet explain another aspect of the present invention, when a row noise suppression function is advantageously implemented, based on unused spare readout channels, where unused means not selected for repairing purpose in the coupling pattern by the switches SW1. But as explained above, in practice, all these routing aspects at the output of the readout channels of the readout circuitry can be managed easily by the column decoder and/or the DSP processor and the present invention is not limited to an hardware implementation of the data routing at the output of the readout circuitry, but applies to a software implementation as well.

Row Noise Suppression

The general principle is illustrated on FIG. 3, while the row noise suppression process is detailed on the diagram of FIG. 4 and FIG. 5 illustrates a practical case where some spare readout channels are used for the repair and remaining spare readout channels can be used for the row noise suppression function according to the invention. According to the invention, when the sensor integrated circuit has been tested and defective readout columns identified, a coupling pattern is determined and implemented (SW1) which uses spare readout channels. Then a first determination is made (step 300, FIG. 4) of how many spare readout channel remain unused. This gives the number A of remaining spare readout channels, together with the position (address) of these A spare readout channels. Note that in practice A is never zero and the A remaining spare readout channels may be sparse over the length of the row. We can assign them a rank k, increasing in the row right direction (by convention) from 1 to A.

These A spare readout channels are used to sample an analog DC reference voltage DC_ref applied to a reference bus B$_{DC}$. This is obtained through a second switch circuit SW2 comprising one multiplexing element per spare readout channel to couple with the reference bus B$_{DC}$ that extends in the row direction over the length of the readout circuitry 2. For each spare readout channel, the respective SW2 multiplexing element is activated only when the spare readout channel is not used for repair (through SW1). At the output of the spare channels, we have represented a switch SW2', which is to make the signal delivered by the spare channel be delivered as a spare signal to the row noise suppression stage, when the spare channel is not used in the repairing pattern. SW2' is exactly in the same state than SW2 (which means a same logic command applying to set both). But as explained above. This hardware representation may not be necessary as the DSP is able to sort out the data signals based on the repairing pattern reflected by the configuration (settings) of SW1s.

Because the spare readout channels implement exactly the same readout operation than the default one, the value representative of the analog DC reference voltage obtained at the output of the spare readout channel is a CDS value, which quantifies the row noise level for the current selected row. In other words, in the spare readout channels operated to sample the DC voltage reference, the SHr and SHs signals (FIG. 9) "sample" quite the same signal and the subtraction between the two samples corresponds to a row noise level. In other words: the subtraction between the two samples results in one actual sample of the row temporal noise.

Then, the readout operation 100 (FIG. 4) performed in the readout circuitry for each new selected row Row$_i$ applies to read the pixel values in the selected row but also to read the signal value Sp$_k$ from each of the A spare readout channels operatively coupled to reference bus B$_{DC}$. This comprises the sample and hold operation 100.1 with the successive sampling of a reference level and a signal level, and the analog to digital conversion 100.2 in each readout channel (FIG. 2) or by a fast ADC shared by the channels (FIG. 1). This readout operation 100 for the current selected row Row$_i$ outputs a flow of data comprising pixel data DATA_pix $\{S_{i,j}\}_{j=1,\ldots N}$ and spare data DATA_spare $\{Sp_k\}_{k=1,\ldots A}$, which are all CDS values (meaning that the reference level and signal level were subtracted to one another).

In step 200.1 (FIG. 4), an average of the $Sp_k$ digital values is computed, over the whole set of spare data DATA_spare $\{Sp_k\}_{k=1,\ldots A}$, which gives a row noise value $RN_i$ for the current selected row Row$_i$. This averaging enables to reduce the horizontal row noise variation (random) in a factor of square root of A.

In step 200.2 this row noise value RN; is then subtracted from each of the pixel values $S_{i,j}$ of the pixel data flow DATA_pix $\{S_{i,j}\}_{j=1,\ldots N}$ for the current selected row Row$_i$, which gives the low noise values $d_{i,j}$ as already explained supra.

Then the process 100 and 200 repeat for each new row of the array, until all the P rows are read.

In FIG. 3, the three illustrated spare readout channels are all available, which results in their spare signals $Sp_1$, $Sp_2$, $Sp_3$ used to compute the averaged row-noise level, $V_{RN_i}$ for the current selected row Row$_i$. In FIG. 5, some spare readout channels are used for repair (selected in SW1s), so that their outputs are not used in the row suppression process: this is why the outputs from RoCsp$_1$ and RoCsp2 are crossed out in the figure. Remains only in the illustration the spare signal $Sp_1$ which is output by the spare channel RoCsp$_3$. The indicia 1 is to mark that it is the first spare signal available for row noise suppression, with the conventions taken in this description.

Note that in both FIGS. 3 and 5, all the process starting from the conversion in digital inside the readout channels is digital. In particular the processing steps 200.1 (evaluation of $RN_i$) and 200.2 (row noise subtraction) can be done through integrated logic circuits or by a DSP (internal or external to the sensor). Also, when the ADC is a single one as in FIG. 1, the processing steps 200.1 and 200.2 takes place after the ADC, and then it can be done on-chip or off-chip by a DSP.

Now regarding the DC analog reference voltage to be sampled by the A spare readout channels according to the invention, as already explained, the readout circuitry 2 comprises a bus line $B_{DC}$, which extends in a row direction to cover the whole set of readout channels. This bus line $B_{DC}$ conveys an analogic DC reference voltage. In practice, the value of this analogic DC reference voltage is determined to correspond to a mid-range of the analog to digital converter(s) of the readout circuitry, which corresponds to the best conditions for efficient row noise suppression. In a practical example, this analogic DC reference can be set to the same voltage as the pixel common mode voltage, normally between 2.2V and 1.6V in 3.3V CIS technology. This analogic DC reference voltage needs not to be generated by a bandgap source, which is much expensive. Any voltage source preferably integrated into the optical sensor may be convenient.

However, it is desirable to have the possibility to easily adapt the voltage level in each optical sensor. Also, it is desirable to obtain a quiet DC signal on the reference bus $B_{DC}$ before the sampling phase for each current selected row. Because otherwise the noise in the DC reference voltage can generate row temporal noise since it is sampled by the spare readout channel used for this purpose.

FIG. 8 illustrates a preferred embodiment 400 to generate and apply a DC analogic reference voltage DC_ref to the reference bus which addresses these different aspects.

It comprises a digital to analog converter, DAC, 401, which makes it easy to program a voltage reference value (digital code) $V\_ref_{DC}$ in a parameter register of the optical sensor, and the desired analog DC reference voltage DC_ref is produced by the DAC. Then an operational amplifier 402 with high driving capability and operated as a follower (output looped back at its inverting input), is used to apply the DC reference DC_ref from the DAC (on its non-inverting input) to the capacitive bus reference line $B_{DC}$.

Preferably, a switch 403 is provided at the output of the follower amplifier 10 which is associated with buffers 404 distributed all along the length of the bus reference line $B_{DC}$ in order to uniformly load the bus reference line $B_{DC}$. The buffers are then connected between a first bus line 405 which connects to the switch 403, and the reference bus $B_{DC}$. By this implementation, the buffers 404 are analog to a big distributed buffer with very low noise.

The operation of the switch 403 together with the buffers immunizes the reference bus $B_{DC}$ against the temporal noise coming from buffer 402 and DAC 401, since the analog signal is sampled and frozen at the input of the row distributed buffers. In practice, the buffers 404 can be a single transistor, or an operational amplifier, mounted as a follower. The output voltage is therefore equal to the input voltage.

As illustrated on FIG. 9, the switch 403 is activated once during each row time by the pulse signal Set_DC, before the reading sequence 100 begins. With the pulse signal Set_DC, the reference bus $B_{DC}$ is set to the DC analog reference voltage DC_ref, and then the reference bus is isolated from the input stage (DAC, Amplifier and Switch): the analog DC voltage value is then frozen and quiet, for the whole following reading sequence for the current selected row, as illustrated on FIG. 9, with reference to a common true CDS readout sequence. Specifically, the switch 403 is activated with the pulse signal Set_DC, and the reference bus $B_{DC}$ is set to the DC analog reference voltage the time of the Set_DC pulse; then it is isolated from the input stage and the DC_ref is frozen. Only then the signal RS is activated in each pixel of the current selected row, to reset the sense node in these pixels, and a corresponding reference level of the sense node is sampled (SHr) in each readout channel; then the signal TX is activated in each pixel of the selected row, to transfer the charges integrated by the pixel to its sense node and a corresponding signal level is sampled (SHr) in the readout channel.

In the spare readout channels operatively connected to the reference bus, the two pulse signals SHr and SHs apply as well, but each results in sampling the DC analog reference voltage on the reference bus $B_{DC}$. This enables through CDS subtraction to obtain a signal (analog or digital) which corresponds to a row noise signal only, which is then subtracted from each of the pixel signals Si,j.

FIG. 7 illustrates a second embodiment, in which the repairing pattern operates on a group basis, in a view to either simplify the command of the multiplexing elements through reducing the setting circuit (FIG. 6) and allows for several spare readout channels between each group of default readout channels, resulting in a better averaging process 200.2.

In this embodiment, the spare groups $Gm_1$, $Gm_2$, $Gm_3$ comprises m spare readout channels, where m is greater than 1. In the figure, m=4. It can be in principle any integer value greater than one, but as usual, it is preferably a power of 2 for decoding aspects. In practice, 4 is a possible value, but m could be also taken to be 8 or 16 for instance. The principle of the invention is not restricted to a specified value.

Then the replacement principle to repair any defective readout channel, is now to shift in the left or the right direction on a group basis. That is, in each default group like $Gn_1$, the default readout channels are further grouped in u subsets of m successive channels (u integer, equal to n/m). As illustrated, we have then in each default group, u subsets $SS_1$ to $SS_u$. The switching circuits SW1 are similarly grouped to form u groups 10.1, 10.2, . . . 10.u of m SW1 circuits in correspondence with the u subsets $SS_1$, $SS_2$, . . . , $SS_u$.

Then when a subset contains at least one defective channel, like $SS_{u-1}$ in the $Gn_1$, the m switching circuits SW1 of the corresponding group 10.u-1 are all set to apply a right shift replacement pattern to route the m corresponding column conductors (inputs), to the m readout channels of the next subset $SS_u$ (on a one to one basis). This scheme propagates in the shift direction up to the spare group $Gm_1$ on the right side of $Gn_1$. That is all the SW1 switches in the group 10.u are set to apply a right shift replacement pattern to route the m corresponding column conductors to the m readout channels of the spare group $Gm_1$ next to the default group $Gn_1$. In this embodiment, and as clear on FIG. 7, a default readout channel is then replaced with a next one m ranks further on its right side or its left side. As explained for the first embodiment the choice of the right shift replacement pattern or left shift replacement pattern in a default group is a matter of proximity of the defective channel with the spare groups framing the default group and also depends on whether the neighboring default groups on the left and the right have defective channels too.

Then the configuration of the switching circuits SW1 is simplified, because the m switching circuits SW1 attached to a given subset are all configured identically, to select the default output (Sel-D), the right output (Sel-R) or the left output (Sel-L). With reference to FIG. 6, this means that a same command signal $C_{10.1}$, is applied to the switch circuit 10.1 of m=4 multiplexing elements attached to the subset $SS_1$ in $Gn_1$. In the example the logic command $C_{10.1}$ selects the default output RoC-D in the m multiplexing elements of circuit 10.1. The logic commands $C1_{0.u-1}$ and $C_{10.u}$ instead each select the right output RoC-R in each of the m multiplexing elements.

Then, the unused spare groups like $Gm_2$ in FIG. 7 can be used for a row suppression noise operation according to the invention. For this row noise suppression, having m neighboring spare readout channels at disposal at each place of an unused spare group makes the averaging over the row length much more efficient.

The readout circuitry implementing the repairing operation as described above is advantageously scalable and repeatable as clear on FIGS. 3, 5 and 7. This remains true when the row noise suppression operation according to the invention is also implemented. The scalability makes it easy to implement the readout circuit for any array size. The repeatability is compatible with stitching technologies which are commonly used to manufacture large surface of integrated circuits. This contributes further in reducing the manufacturing costs.

Finally, the switch circuits SW1, SW2 (and eventually their complements SW1', SW2') are configured through shift register(s), in a setting process of the optical sensor, which defines a routing pattern that repairs the defects found at the manufacturing test process, and defines the spare channels for the row suppression operation. A parameter register of the optical sensor will also be set with the value A to initialize the average step 200.2. Finally, when the DC analog reference voltage is obtained through a DAC, the parameter register will also be set with a corresponding digital value $V\_ref_{DC}$ to be applied in operation to the DAC (FIG. 8).

The invention that has been described makes it possible to obtain an efficient optical sensor with enhanced image quality (good SNR, wide dynamic range) through scalable and programmable readout channels repairing process which enables to easily implement a row noise reduction function at low costs including low manufacturing cost, low surface area cost and low post-processing cost.

The invention claimed is:

1. A CMOS optical sensor comprising a pixel array (1) comprising P rows and N columns of pixels, P and N integers, wherein the pixels belonging to a same column are connected to a respective column conductor and a readout circuitry (2) coupled to the N column conductors of the pixel array to output a digital pixel value ($S_{i,j}$) for each pixel in a selected row, characterized in that the readout circuitry comprises:
   a. N default readout channels ($RoC_1$ to $RoC_N$), one per respective column conductor ($Col_j$) of the pixel array (1) and M spare readout channels ($RoCsp_1$ to $RoCsp_3$), with M<N,
   b. the N+M readout channels are arranged by groups in a repetitive pattern sequence in a row direction of one default group of n successive default readout channels then one spare group of m successive spare readout channels, n and m, integers, N/n integer greater than 1; and M/m integer greater than 1, and
   c. N switching circuits SW1, one per column conductor of the pixel array, each switching circuit configured to electrically connect a respective one of the N column conductors to one readout channel of the readout circuitry selected among: a default channel (RoC-D) for said column conductor, a first replacement readout channel on a left side of said default readout conductor (RoC-L), a second replacement readout channel on a right side of said default readout conductor (RoC-R), wherein said readout circuitry is configured to set the first switch circuits SW1 such that, when in a default group ($Gn_2$) comprises a defective readout channel, one of a left shift coupling pattern or a right shift coupling pattern applies, wherein the left shift coupling pattern selects said first, left, replacement readout channel as a replacement to each of the readout channels of said default group starting from the defective readout channel ($RoC_{11}$) down to the first readout channel ($RoC_9$) of said default group, wherein the right shift coupling pattern selects said second, right, replacement readout channel as a replacement to each of the readout channels in said default group starting from the defective readout channel ($RoC_{15}$) up to the nth readout channel ($RoC_{16}$) in said default group.

2. The CMOS optical sensor of claim 1, in which m=1 and the first, left, replacement readout channel in each first switching circuit is the readout channel next on the left side to the default readout channel, and the second, right, replacement readout channel is the readout channel next on the right side to the default readout channel.

3. The CMOS optical sensor of claim 1, in which m>1, wherein the replacement pattern is on a m group basis and the first, left, replacement readout channel in each first switching circuit is a readout channel at m ranks further on the left side to said default readout channel, and the second, right, replacement readout channel is the readout channel at m ranks further on the right side to said default readout channel.

4. The CMOS optical sensor of claim 3, in which the m first switches SW1 associated with each subset ($SS_1$, $SS_u$) of m default readout channels in a default group ($Gn_1$) are configured through a same logic command ($C_{10.1}$).

5. The CMOS optical sensor of any of claim 1 wherein n is at least equal to 8.

6. The CMOS optical sensor of claim 3, wherein m is at least equal to 4.

7. The CMOS optical sensor of claim 1, further comprising:
an analog DC voltage reference bus ($B_{DC}$) which extends in the row direction over the width of the readout circuitry and
second switching circuits (SW2), one per spare readout channel, each of said second switching circuit to selectively connect the respective spare readout channel when unselected by any first switching circuit (SW1), to said reference bus ($B_{DC}$),
wherein the N and M readout channels are all configured to implement a correlated double sampling (CDS), and the readout circuitry further implements a digital row noise suppression function and is configured for calculating an average row noise value ($RN_i$) from digital signals ($Sp_1$) obtained from the spare readout channel(s) operatively coupled to the DC reference bus through the second switch circuits (SW2) and not selected through any of the first switch (SW1) and for subtracting said average row noise value from each of the pixel values for the current selected row ($Row_i$) provided by the readout channels operatively coupled to respective column conductors of the array through the first switch circuits (SW1).

8. The CMOS optical sensor of claim 7, comprising a third switching circuit (403) configured to timely apply an analog DC voltage reference to the DC reference bus ($B_{DC}$) before a CDS reading phase in the readout channels for a current selected row ($Row_i$).

9. The CMOS optical sensor of claim 8, further comprising buffers (404) distributed over the length of the reference bus ($B_{DC}$) between an output line (405) of the third switching circuit (403) and the reference bus ($B_{DC}$).

10. The CMOS optical sensor of claim 7, wherein the analog DC voltage reference is set to correspond to a mid-range value of an analog to digital conversion range implemented in the readout circuitry.

11. The CMOS optical sensor of claim 7, comprising a digital to analog conversion circuit (401) delivering the analog DC voltage reference.

12. The CMOS optical sensor of claim 1 in which each of the first and second switching circuits are configured through a respective programmable shift register.

13. The CMOS optical sensor of claim 1, in which the analog to digital conversion in each readout channel is operated by an analog to digital converter proper to the readout channel.

14. The CMOS optical sensor of claim 1, in which the analog to digital conversion in each readout channel is operated by an analog to digital converter shared by the readout channels.

15. The CMOS optical sensor of claim 4, wherein n is at least equal to 8.

16. The CMOS optical sensor of claim 4, wherein m is at least equal to 4.

17. The CMOS optical sensor of claim 9, wherein the analog DC voltage reference is set to correspond to a mid-range value of an analog to digital conversion range implemented in the readout circuitry.

18. The CMOS optical sensor of claim 10, comprising a digital to analog conversion circuit (401) delivering the analog DC voltage reference.

19. A reading method in the CMOS optical sensor according to claim 7 with temporal row noise, comprising,
switching the analog DC reference voltage to the DC reference bus, and
repeating, for each selected row ($Row_i$) of the pixel array:
a. reading a signal on each of the column conductors through a respective readout channel selected through the first switch (SW1) and outputting a sampled digital pixel value ($S_{i,j}$);
b. reading a signal on the DC reference bus through each of the spare readout channels selected by the second switches (SW2) and outputting a row noise value ($Sp_1$);
c. computing an average voltage reference value ($RN_i$) for the current selected row ($Row_i$) from the row noise values;
d. subtracting the average voltage reference value ($RN_i$) from each of the digital pixel value ($S_{i,j}$);
e. outputting the resulting digital pixel values ($d_{i,j}$) with lower noise for the current selected row.

20. The reading method of claim 19, comprising setting the analog DC reference voltage to a mid-range value of an analog to digital conversion range.

* * * * *